Jan. 1, 1935.  A. J. PICHL ET AL  1,986,216
THEFT PREVENTION APPARATUS
Filed Aug. 19, 1933   6 Sheets-Sheet 1

INVENTORS;
ANTHONY J. PICHL
ANTHONY J. PICHL JR.
By Bakewell & Church
ATTORNEYS

Jan. 1, 1935.  A. J. PICHL ET AL  1,986,216
THEFT PREVENTION APPARATUS
Filed Aug. 19, 1933   6 Sheets-Sheet 5

INVENTORS:
ANTHONY J. PICHL
ANTHONY J. PICHL JR.
BY Bakewell & Church
ATTORNEYS

Jan. 1, 1935. A. J. PICHL ET AL 1,986,216
THEFT PREVENTION APPARATUS
Filed Aug. 19, 1933 6 Sheets-Sheet 6

INVENTORS;
ANTHONY J. PICHL
ANTHONY J. PICHL JR.
BY Bakewell & Church
ATTORNEYS

Patented Jan. 1, 1935

1,986,216

UNITED STATES PATENT OFFICE 1,986,216

THEFT PREVENTION APPARATUS

Anthony J. Pichl and Anthony J. Pichl, Jr.,
St. Louis, Mo.

Application August 19, 1933, Serial No. 685,812

20 Claims. (Cl. 20—1.01)

This invention relates to an apparatus that is designed for use in banks, stores and other establishments for preventing a hold-up man, thief, or other unauthorized person from gaining access to a compartment or space in which valuables are kept. It relates particularly to theft prevention apparatus of the general type or kind that comprise a passageway through which a person must pass in the act of entering or gaining access to the compartment or space in which the valuables are kept, an entrance door and an exit door for said passageway constructed or arranged so that the exit door leading from the passageway to the compartment containing the valuables, cannot be opened unless the entrance door for said passageway is fully closed, and a locking means for said exit door combined with or controlled by an operating mechanism which has to be operated in a particular manner in order to effect the release of the exit door.

Such apparatus have heretofore proven quite effective for protecting stores, gasoline filling stations and small banks against hold-ups, due primarily to the fact that a thief or hold-up man will not enter and run the risk of becoming trapped in a passageway leading to the compartment containing the valuables, and this is the only way that a hold-up or theft can be accomplished, because the operating mechanism that is associated with the door locking means can only be operated from the interior of said passageway, and moreover, can only be operated after the entrance door for said passageway has been completely closed.

One object of our present invention is to provide a theft prevention apparatus of the general type referred to that is equipped with a novel operating mechanism for the door locking means that can be actuated or operated easily by an authorized person, and which can be easily changed, modified or adjusted to change the number or other indicia which the user of the apparatus must observe in the operation of setting the control member preparatory to bodily moving said control member to set the operating mechanism for the door locking means in action.

Another object is to provide a theft prevention apparatus of the general type referred to, that is equipped with a novel means for releasing the entrance door of the passageway of the apparatus in the event said door has been locked, due to an error on the part of an authorized person in manipulating the control member that forms part of the operating mechanism for the door locking means.

And still another object of our invention is to provide a theft prevention apparatus of the general type referred to, which is of such construction that in the event a thief enters the passageway and becomes trapped therein, due to improper manipulation of the control member, the endeavor of the thief to release himself will be almost certain to cause an alarm to operate and give notice to the police or to someone else whose duty it is to render assistance to the establishment containing the apparatus under such circumstances. Other objects and desirable features of our invention will be hereinafter pointed out.

We have herein illustrated our invention embodied in an apparatus that is adapted to be built into or permanently mounted in a bulletproof wall or partition that separates a room or space to which the public has access from a room, space or compartment in which valuables are kept. In the case of a bank, the wall or partition above referred to may be the wall of a vault, or it may be a bullet-proof glass partition that divides a lobby from a room in which the employees of the bank are located. The passageway of the apparatus, the entrance and exit doors for said passageway, and the door locking means can be constructed in various ways without departing from the spirit of our invention. However, the operating mechanism that is used to actuate the door locking means to effect the release of the exit door, is preferably of the construction herein illustrated and comprises a control member that must be first set in a definite position and thereafter bodily moved a definite distance in order to cause the operating mechanism to effect the release of the exit door. There is only one particular or definite position out of a large number of possible positions in which the control member can be set, in order to effect the release of the exit door, and the operating mechanism is so constructed that if the user sets the control member improperly, and thereafter moves it bodily in an attempt to render the door locking means inactive, certain, parts of the operating mechanism will become locked in such a way that it is almost impossible for an unauthorized person to release them, and considerable time will be required even for an authorized person to release said parts. Usually, the apparatus will be equipped with a signal arranged in such a way that as soon as an attempt is made to release the parts of the operating mechanism which have become locked, due to an improper setting of the control member, said signal will act, and thus notify the police or some other authority that an attempt is being made to hold up or burglarize the establishment in which the apparatus is installed. In the preferred form of our invention herein illustrated the passageway of the apparatus is made of such dimensions that it is impossible for more than one person to enter and pass through said passageway at the same time, this being done so as to eliminate the possibility of a thief or robber forcing an employee of the establishment to accompany him (the thief) into the passageway, and then forcing the employee at the point of a weapon to manipulate or actuate the operating mechanism that effects the release of the exit door.

Figure 1:
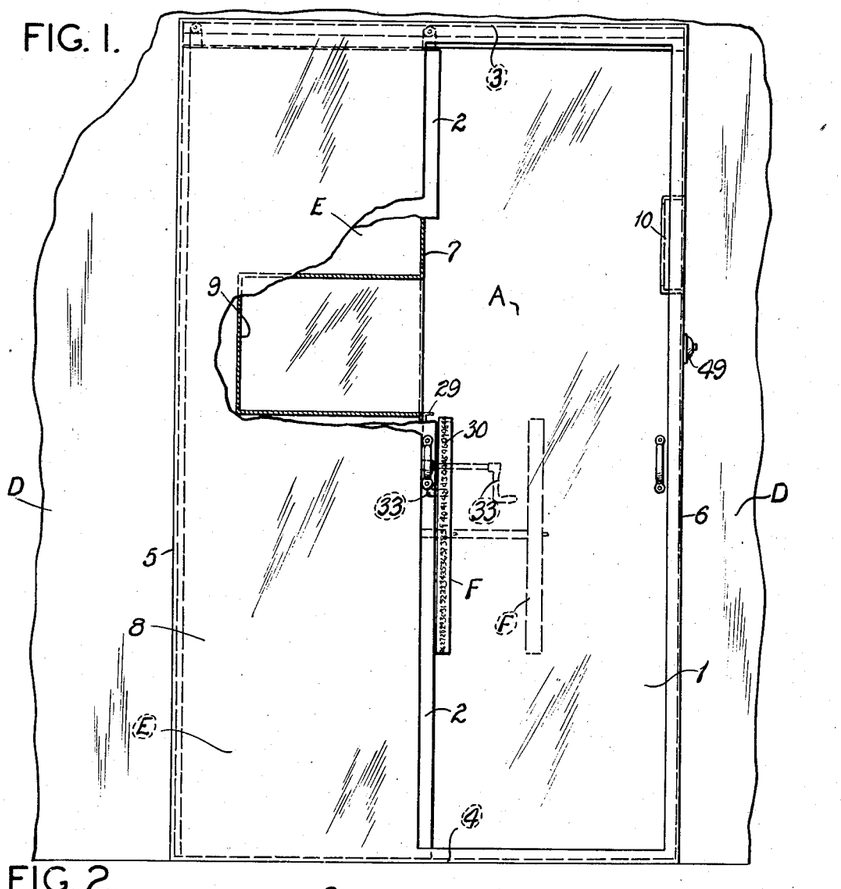
Figure 1 of the drawings is a side elevational view of our improved apparatus, partly broken away, showing the entrance door closed and the exit door fully opened.
Figure 2:
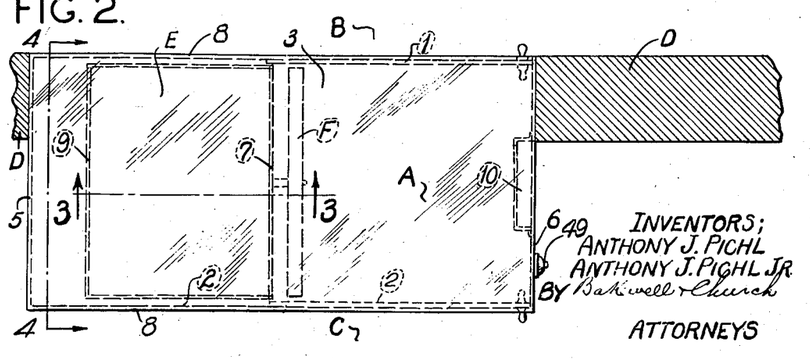
Figure 2 is a top plan view of the apparatus, showing the entrance door and exit door closed.

In the accompanying drawings which illustrate the preferred form of our invention, A in Figure 1 designates the passageway of the apparatus, which passageway, as previously stated, constitutes a pathway leading from a space B, to which the public has access, into a space or compartment C in which valuables are kept, said passageway A being provided with an entrance door 1 and an exit door 2, as shown in Figures 1 and 2. For convenience in manufacture and installation, the apparatus will usually be constructed in the form of a metal cabinet that can be permanently installed in a wall or partition D that separates the space B from the space or compartment C. Said metal cabinet is herein illustrated as being provided with a top wall 3, a bottom 4 and end walls 5 and 6. The interior of the cabinet is divided by a metal partition 7 into two sections, one of which constitutes the passageway A, and the other a space E for receiving the door locking means and the operating mechanism for same, the said space E being provided with side walls 8 to which the top and bottom walls and the end wall 5 of the cabinet are attached. The entrance door 1 and the exit door 2 for the passageway A are arranged in parallel relation and are constructed so as to slide into the space E when said doors are moved into their open position. The part 9 of the apparatus illustrated in Figures 1 and 2, consists of an open-ended metal box or container carried by the partition 7 and projecting into the space E so as to serve as a shelf, accessible from the passageway A, on which a person moving through said passageway can deposit any article which he may be carrying, such as a satchel, preparatory to manipulating the control member to effect the release of the exit door. One wall of the passageway A may also be provided with a piece of bullet-proof glass 10 arranged so that a person stationed in the space or compartment C that holds the valuables may ascertain who is in the passageway A, even though the exit door 2, which is solid, is completely closed.

Figure 4:
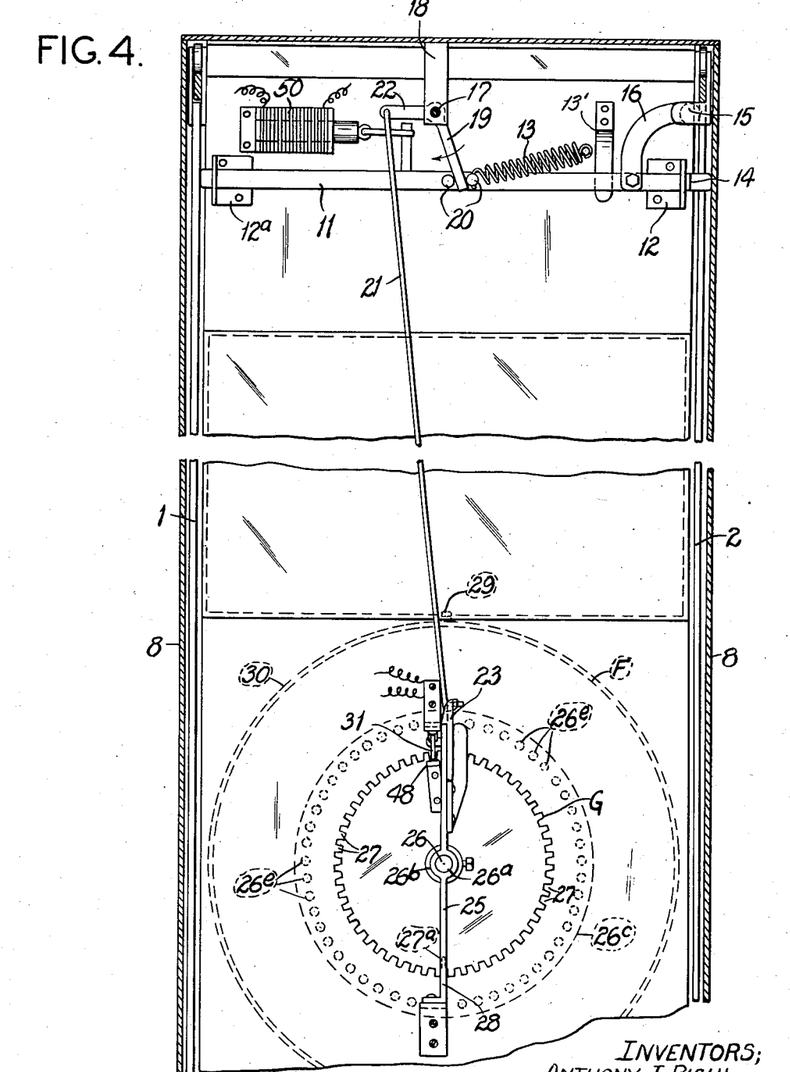
Figure 4 is an enlarged, fragmentary, vertical transverse sectional view, taken on approximately the line 4—4 of Figure 2.
Figure 7:
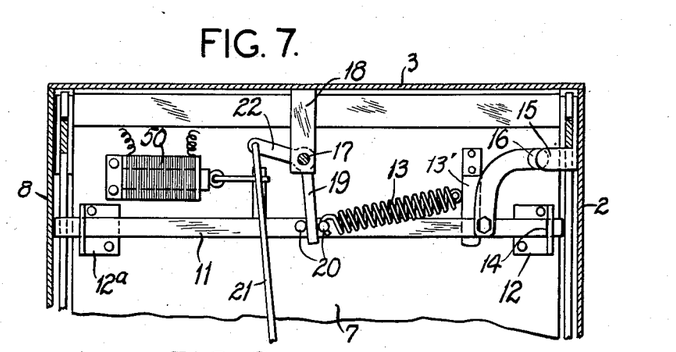
Figure 7 is an elevational view of the door locking means, similar to Figure 4, but showing the exit door open.
Figure 12:
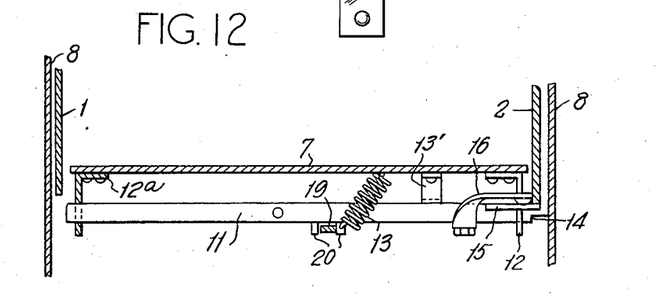
Figure 12 is a top plan view of the lock bar 11 and associated parts, shown in Figure 4.

The exit door 2 is normally locked in its fully closed position by a locking means, herein illustrated as consisting of a horizontally-disposed lock bar 11 slidingly mounted in guides 12 and 12ᵃ on the face of the partition 7 remote from the passageway A and arranged so that one end of said lock bar laps over the rear edge of the exit door 2, as shown in Figures 4 and 12, when said exit door is closed. At such times, i. e., when the lock bar 11 is in its normal position, the opposite end of said lock bar is out of the path of the rear edge of the entrance door 1, (see Figure 12) and hence, said entrance door is free to slide into the space E of the cabinet, and thus permit a person to enter the passageway A from the space B to which the public has access. Said lock bar 11 is held in the position last referred to by means of a coiled contractile spring 13 which is disposed so as to move said bar to the right, looking at Figure 4. The lock bar 11 is also acted upon by a leaf spring 13' or equivalent means, which constantly exerts pressure on said lock bar in a direction tending to force it laterally, away from the partition 7, and towards the guide 12 in which said bar slides. When the lock bar 11 is moved longitudinally, towards the left, looking at Figure 12, so as to release the exit door 2, as hereinafter described, the pressure of the spring 13' on said bar causes a notch 14 in the end of the bar to snap into engagement with the bracket 12, thereby retaining the bar 11 in a position in which one end portion of said bar clears the exit door 2 and the other end portion of said bar laps over the entrance door, as shown in Figure 7, and prevents said entrance door from being opened. In order to release the entrance door 1, it is necessary to close the exit door 2, and in the apparatus herein illustrated the movement of the exit door back to its closed position causes the notch 14 in the lock bar 11 to be automatically disengaged from its co-acting part on the bracket 12, the means employed for this purpose consisting of a laterally-projecting arm 15 on the inside of the exit door 2 arranged so that when the exit door moves into its substantially fully closed position, said arm 15 will strike an arm 16 on the lock bar 11 and move said lock bar laterally or in opposition to the force which the spring 13' exerts on said bar, thereby releasing the bar 11 from the bracket 12 and permitting the spring 13 to move the lock bar longitudinally out of overlapping relationship with the entrance door 1 and into overlapping relationship with the edge of the exit door 2.

The lock bar 11 is moved in a direction to release the exit door, by an operating mechanism of novel construction which comprises a control member located in the passageway A, and preferably constructed in such a way that said control member must first be set by turning or rotating it into a definite position and thereafter moving said control member bodily, so as to set the operating mechanism in action. There are a large number of possible positions in which the control member can be set, but only a particular one of the numerous possible positions of said control member will permit the operating mechanism to make a full stroke, or, in other words, move sufficiently to effect the release of the exit door. In any of the various other possible positions of the control member said control member can be moved bodily a certain distance, but the extent to which said control member can be moved under such circumstances will not impart a full stroke to the operating mechanism. Moreover, if the control member is improperly set and then moved bodily, a latch becomes operative to engage said control member and prevent it from being quickly restored to its former position. In order that the apparatus may be operated by an authorized person who has made an error in setting the control member, and then bodily moved said control member into a position wherein both doors of the passageway A will become locked, the operating mechanism is equipped with a manually-operable tripping means by which a person located in the passageway A can effect the restoration of the control member and the parts associated with same to their normal position, and in this way, release the entrance door of the passageway A. Some time is required to do this, however, i. e., to properly operate the tripping means, and in most instances the apparatus will be equipped with a signal which is so arranged that it will operate automatically, and thus call the police or other authority as soon as the tripping means is manipulated to restore or try to restore the parts of the operating mechanism that have become locked, due to an improper setting of the control member. The operating mechanism for the door locking means is herein illustrated as comprising a horizontally-disposed rock shaft 17 mounted in bearings 18 in the upper portion of the space E of the cabinet, an arm 19 on one end of said rock shaft that is positioned between a pair of laterally-projecting pins 20 on the lock bar 11, a link 21 attached at its upper end to an angularly-disposed arm 22 on the opposite end of the rock shaft 17, and an actuator 23 (see Figure 3) attached to the lower end of the link 21. The operating mechanism also comprises a control member F located in the passageway A and rigidly combined with a notched element G, which, when moved bodily a certain definite distance in the direction indicated by the arrow $x$ in Figure 3, will cause the actuator 23 to move far enough to cause the arm 19 of the rock shaft 17 to shift the lock bar 11 out of overlapping relationship with the rear edge of the exit door 2, thus releasing said door.

Figure 3:
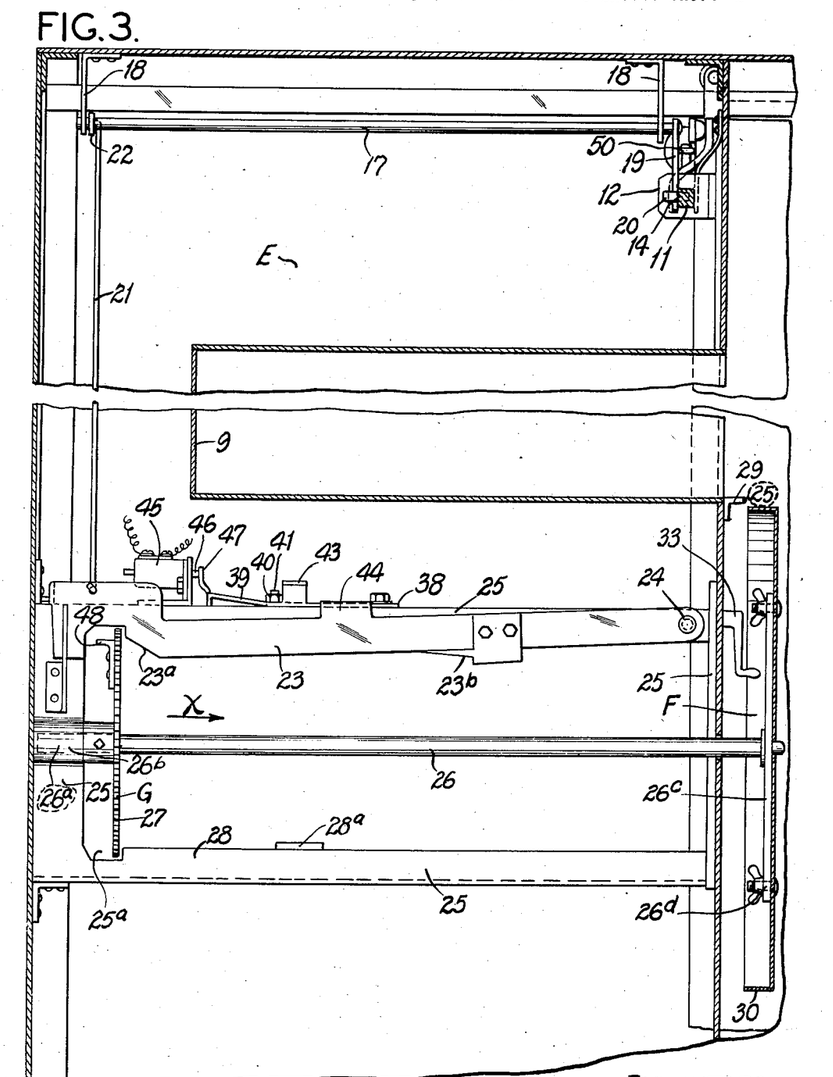
Figure 3 is an enlarged fragmentary vertical longitudinal sectional view of the apparatus, taken on approximately the line 3—3 of Figure 2.

The actuator 23, which is preferably constructed in the form of a lever, is pivotally attached at 24 to a supporting structure, designated as an entirety by the reference character 25, that is rigidly mounted inside of the space E of the cabinet. In Figure 3 said actuator is shown in side elevation. The control member F consists of a wheel attached to the forward end of a horizontally-disposed rod or shaft 26 that projects forwardly into the passageway A through a hole in the partition 7, and the notched element G previously mentioned is rigidly attached to the rear end portion of said rod or shaft 26. The notched element G consists of a disk provided in its peripheral edge with a large number of notches 27 (see Figures 3, 4 and 11) and the supporting structure 25 is provided with a rigid, horizontally-disposed guide 28 that co-acts with the notched element G to govern the setting of the control member F. Each notch 27 of the element G constitutes a possible position in which the control member F may be set preparatory to moving said member bodily, but there is only one definite position of the control member that will permit said control member to move bodily far enough to effect the release of the exit door. In the apparatus herein illustrated one of the notches 27 of the element G is provided with a reduced extension $27^a$ (see Figure 11), and the guide 28, previously mentioned, is provided with a reduced projection $28^a$ that serves as a stop which limits the forward movement of the notched element G in all possible positions of the control member except the one position in which the narrow slot $27^a$ in the notched element G is in longitudinal alignment with the projection $28^a$ on the guide 28, said projection $28^a$ being of such width that it will enter and pass freely through the reduced or narrow slot $27^a$ of the element G.

Figure 8:
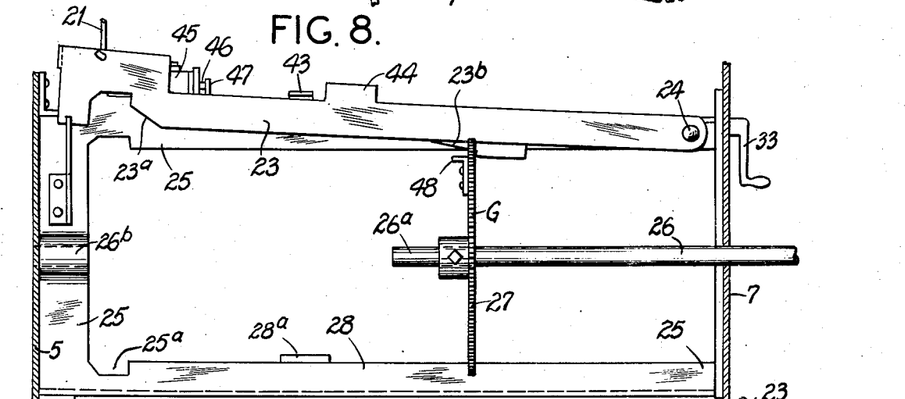
Figure 8 is a side elevational view of the operating mechanism for the door locking means, illustrating the notched element moved forwardly far enough to impart a full stroke to the actuator and cause the exit door to be released.
Figure 9:
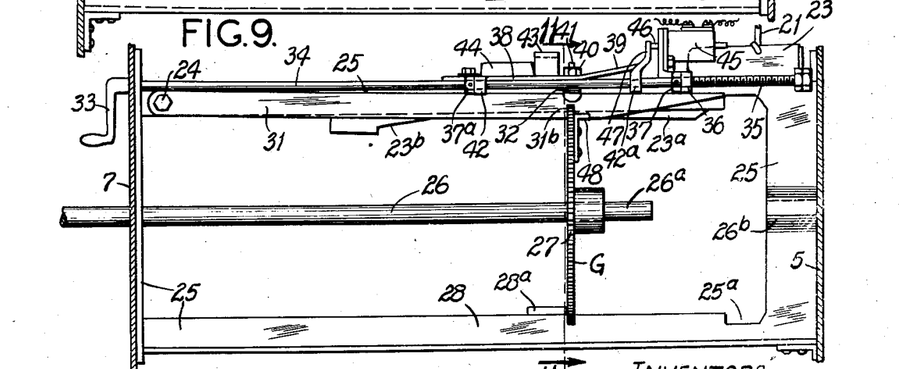
Figure 9 is a side elevational view of the operating mechanism for the door locking means, similar to Figure 6, but showing the notched element locked by the latch associated with same after said notched element has been moved forwardly in an unsuccessful attempt to release the exit door.

Normally, the notched element G is arranged in a clearance space $25^a$ in the supporting structure 25, which is of such dimensions that there are no parts of said supporting structure which will interfere with the rotary movement of the notched element G. Consequently, a person standing in the passageway A can grasp the control member F and turn said member so as to bring one of the notches 27 of the element G into alignment or registration with the rear end of the guide 28, after which the control member F and the notched element G with which it is combined can be moved forwardly, as shown in Figure 9. When the notched element G is in its normal position, i. e., in the clearance space $25^a$ of the supporting structure, said element is sustained by a trunnion portion $26^a$ on the rear end of the rod 26 that projects into a bearing $26^b$ on the supporting structure 25, and when the control member F is moved forwardly into the passageway A, the notched element G slides upon and is supported by the guide 28. If, preparatory to moving the notched element G forwardly, said element was turned into such a position that any one of the notches 27 in same, other than the notch provided with the reduced extension $27^a$, aligns with the guide 28, the element G will start to move forwardly and will be stopped when it comes against the reduced projection $28^a$ on the guide 28. Such forward movement of the notched element G causes the actuator 23 to move upwardly a slight distance, due to the engagement of the element G with an inclined surface $23^a$ on the rear end portion of said actuator, but such slight upward movement of the actuator will not withdraw the lock bar 11 from overlapping relationship with the exit door 2. The only way that the exit door can be released from the lock bar 11 is by imparting a full upward stroke to the actuator 23, and this can be accomplished only by moving the notched element G forwardly past the stop 28ª on the guide 28, so as to cause the element G to engage an inclined or cam surface 23ᵇ on the actuator 23, as shown in Figure 8. Thus, it will be seen that in our improved apparatus the degree or extent of bodily movement of the notched element G is the thing that determines whether or not the exit door will be released, and the turning or rotation of said element G into only one of a large number of possible positions which said element is capable of assuming, is the thing that determines whether or not the element G may be moved bodily to the extent or degree required to effect the release of the exit door. While it is immaterial how many notches 27 are used on the element G, we have found that if said element is equipped with, say, fifty notches, it is a fairly easy matter to set said element in a position where it can be started on its forward travel, but as there is only one out of fifty positions of the element G that will effect the release of the exit door of the passageway A, there is little chance of a thief or unauthorized person gaining access to the compartment in which the valuables are kept. The proper or correct setting of the control member F and the notched element G associated with same is obtained by observing a number or other indicator on said control member and then turning said control member into a position to cause said number or indicator to register or align with a stationary device, such, for example, as a hand or pointer 29 mounted on the partition 7 inside of the passageway A, it being preferable to provide the control member F with a rim 30 having printed or marked thereon numerals corresponding to the number of notches 27 in the element G. In Figure 3 the numeral 25 surrounded by a dotted circle is intended to represent the numeral on the rim 30 of the control member F, which must be brought into registration with the pointer 29, in order to cause the reduced notch 27ª of the element G to align with the stop device 28ª on the guide 28. In order that the operating mechanism of the apparatus may be easily changed so as to utilize different numerals on the rim of the control member F to effect the release of the exit door of the passageway of the apparatus, the control member F is adjustably combined with the shaft or rod 26 that connects said control member with the notched element G. One convenient way of adjustably combining said parts is to provide the shaft 26 with a hub plate 26ᶜ that carries bolts 26ᵈ which can be inserted in holes in the web of the control member F, designated by the reference character 26ᵉ in Figure 4, the control member being provided with a circular row of holes 26ᵉ that correspond in number to the number of notches 27 in the element G. Thus, by changing the adjustment or position of the control member F on the shaft 26, a different numeral can be used for each day or for any desired stated period, to govern the setting of the control member F.

Figures 5, 6, 10:
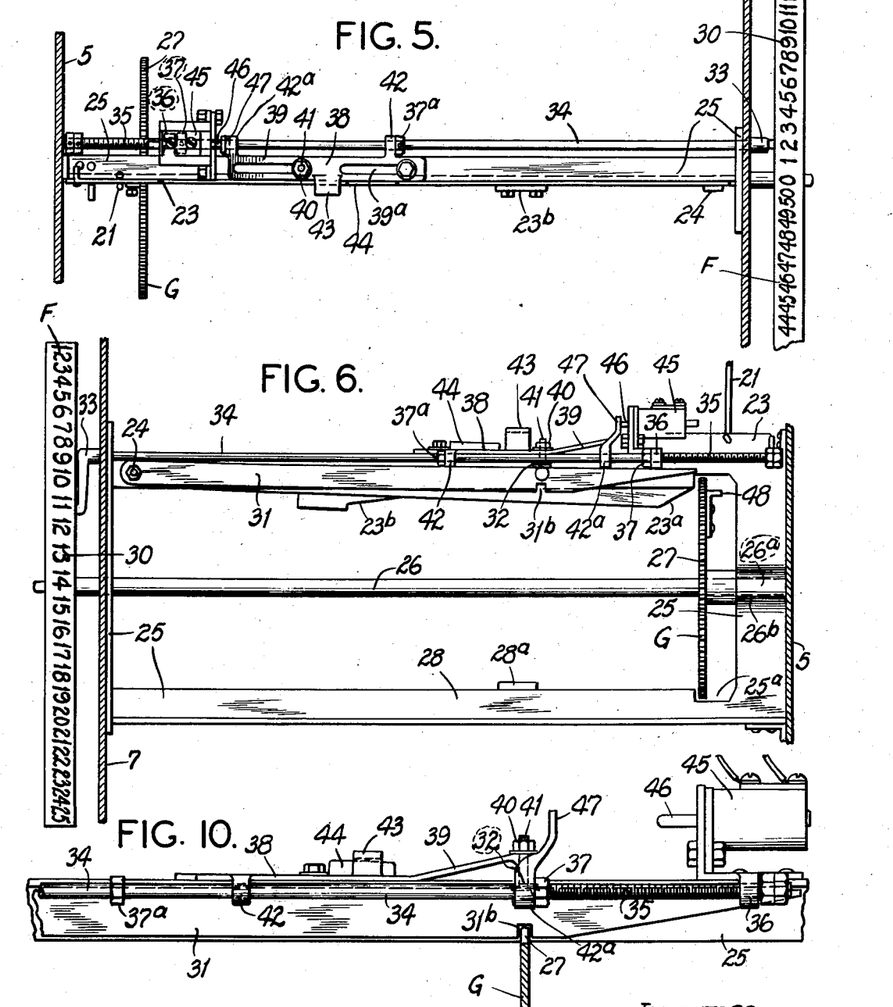
Figure 5 is a top plan view of the operating mechanism for the door locking means.
Figure 6 is a side elevational view of the operating mechanism shown in Figure 5, illustrating the latch for the notched element which is combined with the control member, and showing said element in its normal, inactive position.
Figure 10 is a view similar to Figure 9, showing the cam plate shifted forwardly into a position to free the notched element from the latch associated with same.
Figure 11:
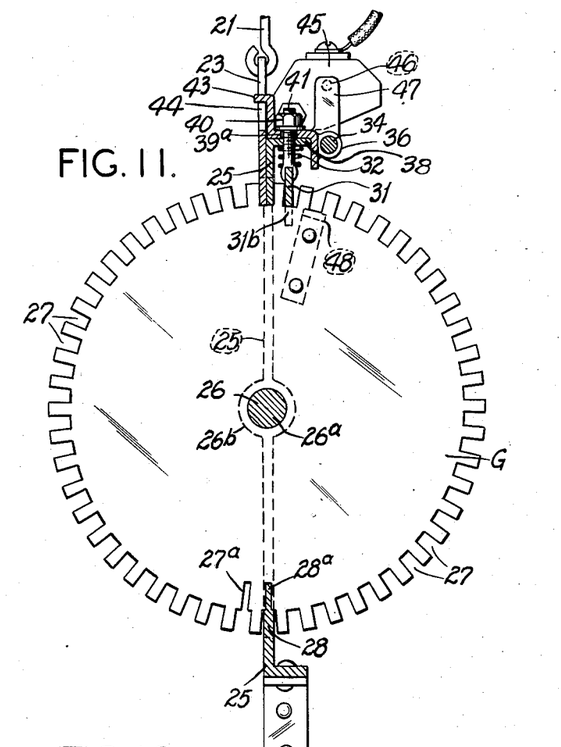
Figure 11 is an enlarged transverse sectional view, taken on the line 11—11 of Figure 9, looking in the direction indicated by the arrows.

When the notched element G is set in an incorrect position and moved forwardly into engagement with the stop 28ª, as shown in Figure 9, a latch 31 acts automatically to engage the notched element G and lock it in this position, thereby preventing the control member F and notched element G from being restored to their former position, with the hope of being able to again rotate the control member F, with a view of trying to select the correct position of the element G that will permit the same to move forwardly past the stop 28ª. The latch 31 consists of a long lever pivotally mounted at 24 on the supporting structure 25 at the opposite side of the web piece of said structure that carries the actuator 23. Said latch 31 is provided on its underside with a notch 31ᵇ, shown in Figure 6, and a spring 32, shown in Figure 11, is used to normally exert downward pressure on said latch and hold it in such a position that it is ready to snap into engagement with the notched element G. As soon as the forward movement of said notched element is interrupted by striking the stop 28ª, the notch 31ª in the latch will engage the element G and effectively hold the same against rearward movement, i. e., movement in a direction to disengage the element G from the guide 28 and permit said element G to be turned. The only way that the element G can be moved rearwardly into the clearance space 25ª in the supporting structure, is by manipulating a tripping mechanism which is preferably constructed in such a manner that considerable time is required to actuate the latch 31 to release the notched element G, and moreover, during this operation, a signal will act and give notice to the police or some other authority that an attempt is being made to gain access to the compartment of the apparatus in which the valuables are kept. The tripping mechanism above referred to comprises a crank handle 33 positioned in the passageway A and arranged behind the control member F, as shown in Figure 1. Said crank handle is attached to the front end of a horizontally-disposed shaft or rod 34 that projects forwardly through the partition member and which is provided at its rear end with an externally screw-threaded portion 35 that engages screw threads carried by a part 36 on the supporting structure 25, thereby causing the shaft 34 to move bodily in one direction when the crank handle 33 is turned clockwise, and to move bodily in the opposite direction when said crank is turned anti-clockwise. A stop 37 on the shaft 34 co-acts with a reciprocating cam plate 38 on the supporting structure 25 to move said cam plate in a direction to render the latch 31 inoperative or to disengage the latch from the notched element G, and a second stop 37ª on the shaft or rod 34 is used to engage the cam plate 38 and restore it to its normal position so as to permit the latch 31 to again become operative to engage and hold the notched element G, when said element is moved bodily after an incorrect setting of the control member F. As shown in Figures 5 and 10, the cam plate 38 is arranged to slide horizontally on the web piece of the supporting structure that carries the latch 31, and said cam plate is provided with an inclined portion or cam 39 that co-acts with a head piece or nut 40 on the upper end of a bolt or similar part 41 that projects upwardly from the latch 31, as shown more clearly in Figure 11. The spring 32, previously referred to, is mounted on the bolt 41 between the latch 31 and the part of the supporting structure on which the cam plate slides, and the cam or inclined portion 39 on said plate is provided with an elongated slot 39ª, see Figure 5, up through which the bolt 41 projects. The actuating rod 34 extends through laterally-projecting ears 42 and 42ª on the cam plate, which ears co-operate with the stops on the actuating rod 34 to impart longitudinal movement to the cam plate. When the rod 34 is rotated in a direction to cause it to move forwardly, i. e., towards the passageway A, the stop 37 will engage the ear 42ª on the cam plate and move said cam plate forwardly, with the result that the cam 39 will cause the latch 31 to be raised or disengaged from the notched element G. Even though the element G has been released from its latch, the control member F cannot be moved quickly back to its former position, due to the fact that the crank 33 is arranged directly behind said control member. Accordingly, before the control member F and the notched element G can be restored to a position wherein they can be rotated so as to endeavor to bring another notch 27 into alignment with the guide 28, the crank 33 must be turned in a direction to cause the actuating rod 34 to move rearwardly so as to carry the crank 33 out of the path of rearward movement of the control member F. Preferably, the screw-threaded portion 35 of the actuating rod 34 is provided with threads of such pitch as to make the rod 34 travel slowly endwise, when said rod is being rotated, as by so doing we reduce the chance of a thief extricating himself from the passageway A. When the rod 34 is rotated in a direction to restore said rod to its former position, the stop 37ª thereon engages the ear 42 on the cam plate 38 and moves said cam plate back to its former position, whereupon the latch 31 is restored to its normal operative condition. When the cam plate 38 is in its forward position, i. e., in a position to hold the latch 31 inoperative, the actuator 23 is effectively held against upward movement by means of a laterally-projecting arm 43 on the cam plate that laps over an upwardly-projecting extension 44 on the actuator, as shown in Figure 10, said extension 44 being of the same thickness as the actuator and projecting upwardly from the top edge of same. When the cam plate 38 is in its rearward position, the laterally projecting arm 43 thereon is located outside of the zone in which the extension 44 of the actuator lies, as shown clearly in Figures 3, 6, 8 and 9. Accordingly, even if a thief should manipulate the rod 34 so as to release the latch 31 when the cam plate 38 is in its forward position, and should then saw off the portion of the actuating rod 34 which projects into the passageway A, thus permitting the control member F and notched element G to be moved rearwardly, it would be impossible for the actuator to move in a direction to effect the release of the exit door, due to the fact that the actuator 23 is held against upward movement by the engagement of the arm 43 on the cam plate with the extension 44 on the actuator. It is, of course, not essential to use a screw-threaded shaft or rod to move the cam plate 38, but we prefer to construct the tripping mechanism of the apparatus in this way on account of the fact that considerable time is required, as previously explained, to move the cam plate in a direction to release the latch 31, and then shift said cam plate back into a position where it does not hold the actuator 23 against upward movement.

This interval of time is made good use of in the apparatus herein illustrated by equipping the apparatus with a signal switch 45 provided with a part 46 that coacts with an arm 47 on the cam plate to cause a police signal or other suitable signal to operate as soon as the cam plate 38 starts to move in a direction to disengage the latch 31 from the notched element G, the part 46 on the signal switch being spring-pressed and arranged so that as soon as the shaft or rod 34 is turned in a direction to reduce the pressure of the stop 37ª on the ear 42 of the cam plate, said spring-pressed switch part 46 will move in a direction to cause the switch 45 to operate the signal. Hence, ample time is provided for the police or other authority to reach the establishment before the thief has had time to release himself from the passageway A, even though the thief understands the method of operating the apparatus to release the entrance door 1 after an unsuccessful attempt to set the control member F in the proper position. In order to prevent the latch 31 from snapping into engagement with the notched element G when said element is moved forwardly past the stop 28ª by an authorized person after a correct or proper setting of the control member F, the notched element G is provided with a laterally-projecting lug 48 disposed in such relationship with the reduced notch 27ª in the element G, that when said reduced notch is brought into alignment with the guide 28, the lug 48 will be in alignment with the latch 31 and will bear against the underside of said latch and bridge the gap 31ᵇ in same when the notched element G moves forwardly over the stop 28ª on the guide 28.

To facilitate the operation of the apparatus and reduce the time required for an authorized person to pass through the passageway A, the apparatus is equipped with a means by which a person located in the space C that contains the valuables can quickly shift the exit door lock bar 11 into its inactive or inoperative position. Said means is herein illustrated as consisting of a switch 49 (see Figure 1), located in the space C and adapted to govern a solenoid 50, (see Figure 4), which is associated with the lock bar 11. When the switch 49 is operated, the solenoid 50 will move the lock bar 11 in a direction to release the exit door. Instead of using a switch and a solenoid or the like to move the lock bar 11 into its inactive or inoperative position, it would be possible to use a manually-operable means accessible from the space C.

When the entrance door 1 is in its open position, the lock bar 11 bears at one end against the inside face of said door, and the opposite end of said lock bar laps over the rear edge of the exit door 2. At such times, i. e., when the entrance door is open, it is impossible to move the notched element G forwardly out of the clearance space 25ª in the supporting structure, and thus set in action the operating mechanism for the door locking means. This is because the actuator 23 is directly connected by the link 21 with the rock shaft 17, and hence, any pressure exerted by the notched element G on the inclined surface 23ª of the actuator, is resisted by the inside face of the entrance door bearing against the end of the lock bar 11. The only way that the notched element G and the control member F can be moved bodily or forwardly, is to first close the entrance door, so as to permit the lock bar 11 to clear the rear edge of said door. After said entrance door has been closed, the control member F and part associated with same can be moved bodily in a direction to cause the actuator 23 to start to move upwardly, the first portion of the upward movement of the actuator causing the lock bar 11 to move into locking engagement with the entrance door. During this initial movement of the lock bar 11, after closing of the entrance door 1, the notch 14 in said lock bar snaps into engagement with the bracket 12, as previously explained, and thus effectively locks the entrance door and prevents it from being opened, due, of course, to the fact that the engagement of the notched portion of the bar 11 with the bracket 12 prevents the bar 11 from moving endwise out of overlapping relationship with the entrance door 1. The lock bar 11 remains in the position just described until the part 15 on the exit door 2 strikes against the arm 16 on the lock bar 11 in the operation of closing the exit door, the engagement of said part 15 with said arm 16 causing the lock bar to be released from the bracket 12, whereupon the spring 13 will restore the lock bar to its normal position.

The method of using our improved apparatus is practically as follows:

Normally, the exit door is locked in its closed position and the entrance door of the passageway A is open. If an authorized person desires to enter the space C in which the valuables are kept, he enters the passageway A, then closes the entrance door 1, and thereafter turns the control member F into such a position that the numeral or mark thereon which designates the proper setting or correct position of the control member, is in registration with the pointer 29 on the partition 7 of said passageway. This rotary movement of the control member F brings the narrow notch 27a in the notched element G into longitudinal alignment with the guide 28, and the next step is to pull the control member F forwardly into the passageway A, as indicated in broken lines in Figure 1, so as to cause the notched element G to move forwardly far enough to engage the inclined surface 23b on the actuator and impart a full upward stroke to the actuator, such full upward stroke causing the arm 19 of the rock shaft 17 to move the lock bar 11 out of overlapping relationship with the exit door 2, after which the user can open said exit door and enter the space or compartment C. If the user, who, we will assume, is an authorized person, makes an error in setting the control member F, such, for example, as turning said control member into such a position that the narrow or reduced notch 27a in the notched element G does not align with the guide 28, the user can still pull the control member F forwardly a slight distance, but when the notched element G strikes against the stop 28a on the guide 28, the forward movement of the notched element G and the control member will be arrested, and said notched element will become locked by the latch 31 which snaps into engagement with same. The user can release himself from the passageway A, however, by rotating the crank handle 33 of the actuating rod 34 in a direction to cause said rod to move forwardly, whereupon the cam 39 of the cam plate 38 will disengage the latch 31 from the notched element G during the forward movement of the cam plate 38. After the said cam plate has been moved forwardly it is necessary for the user to perform still another operation to effect his release from the passageway A, i. e., it is necessary to move the actuating rod 34 rearwardly or restore it to its former position, and this can only be accomplished by rotating the rod 34 in the opposite direction, so as to carry said rod or the crank handle 33 thereon out of the path of rearward movement of the control member F. The object of constructing the apparatus in this way is to make it possible for an authorized person to release himself from the passageway A, but to make it extremely difficult for an unauthorized person to get out of said passageway after having entered the same and closed the entrance door 1. If the person who entered the passageway A was an unauthorized person not familiar with the construction and method of operating the apparatus, it might be possible for him to set the control member F in one of its numerous possible positions and move said member bodily in a direction to start the actuator 23 to rise, but there is only one chance out of fifty that the user could guess the correct setting position of the control member, and if he selected any but the correct position, the notched element G would automatically become locked by the latch 31 when said element strikes against the stop 28a. After the control member F is moved forwardly, as just explained, the crank handle 33 is in plain view of the person standing in the passageway, and if said person should then grasp said crank handle and turn it, the first thing that would happen is, that the switch 45 would operate to cause the signal to act, thereby giving notice to the police or the like that someone is attempting to enter the compartment or space C of the apparatus in which the valuables are kept. If rotation of the actuating rod 34 has failed to release the locked parts of the mechanism, the user cannot thereafter restore the control member F to its former position without first restoring the rod 34 or moving it rearwardly, due to the fact that said rod 34, when in its forward position, effectively prevents the control member F from being moved rearwardly or back to a position where it can be rotated, with the hope of trying to find the correct setting of said control member. After the control member has been set and started on its forward movement, both doors of the passageway A are held securely locked by the lock bar 11, and no rotary movement of the control member into another position is possible without first completely restoring the notched element G to the clearance space 25a of the supporting structure, due, of course, to the fact that when the notched element G is moved forwardly out of said clearance space, said element is effectively held against rotation by the guide 28 on which it travels. The particular arrangement of the control member F in the passageway A is not absolutely essential, but we prefer to arrange said control member in the manner herein illustrated, because by so doing, said control member tends to cramp the user and cut down the free working space in the passageway A when said control member is moved forwardly into said passageway, as must be done in the act of operating said control member to effect the release of the exit door. Obviously, by reducing the size of the working space in the passageway, it makes it more difficult for an unauthorized person to release himself from said passageway. The locking part 43 on the cam plate 38 which moves into overlapping relationship with the actuator 23 also performs a very useful function, in that it effectively prevents the actuator 23 from being moved upwardly far enough to effect the release of the exit door, even though the person in the passageway A should cut off the portion of the actuating rod 34 projecting into said passageway after a forward movement of the cam plate 38 to release the latch 31 which holds the notched element G. The switch and solenoid 49 and 50, respectively, are not essential parts of the apparatus, although it is preferable to equip the apparatus with such devices or a manually-operable releasing means for the lock bar 11, so as to make it easy for an authorized person to enter the compartment C after said person has signalled to an employee of the establishment located in the compartment C.

Having thus described our invention, what we claim and desire to secure by Letters Patent is:

1. An apparatus for the purpose described, comprising a passageway that serves as the entrance to a compartment or space in which valuables are kept, an exit door for cutting off communication between said passageway and compartment, a locking means for preventing the exit door from being opened, and an operating mechanism for rendering said locking means inactive, comprising a rotatable dial in said passageway that has to be turned into only one of a plurality of possible positions and thereafter moved bodily to effect the release of said exit door.

2. An apparatus for the purpose described, comprising a passageway that serves as the entrance to a compartment or space in which valuables are kept, an entrance door and an exit door for said passageway, a locking means for preventing the exit door from being opened, and an operating mechanism for rendering said locking means inactive, comprising a manually adjustable control member in said passageway that has to be set in only one of a plurality of possible positions and thereafter moved bodily to set said operating mechanism in action, said manually-adjustable control member having provision for enabling it to be adjusted so as to change the critical or particular position of said member that will set the operating mechanism in action.

3. An apparatus for the purpose described, comprising a passageway that serves as the entrance to a compartment or space in which valuables are kept, an entrance door and an exit door for said passageway, a locking means for preventing the exit door from being opened, and an operating mechanism for rendering said locking means inactive, comprising a control member in said passageway which the user first sets in a selected position and thereafter moves bodily to set said operating mechanism in action, said control member being so arranged that it tends to obstruct said passageway when said control member moves bodily.

4. An apparatus for the purpose described, comprising a passageway that serves as the entrance to a compartment or space in which valuables are kept, an entrance door and an exit door for said passageway, a locking means for preventing the exit door from being opened, and an operating mechanism for rendering said locking means inactive, comprising a rotatable control member that has to be rotated into a particular one of a plurality of possible positions and thereafter moved bodily a certain definite distance into a position wherein it prevents more than one person from occupying the space of the passageway at the time said control member is moved bodily.

5. An apparatus for the purpose described, comprising a passageway that serves as the entrance to a compartment or space in which valuables are kept, an entrance door and an exit door for said passageway, a locking means for preventing the exit door from being opened, and an operating mechanism for rendering said locking means inactive, comprising a rotatable dial in said passageway that is capable of being set in a plurality of possible positions and thereafter actuated to impart movement to said operating mechanism, means for preventing said operating mechanism from effecting the release of the exit door unless said dial has been set in a particular one of its numerous possible positions, and means for enabling said dial to be adjusted so as to change the particular position of the dial that will permit or cause the exit door to be released.

6. An apparatus of the kind described in claim 5, in which the control member is provided with an adjustable or variable part whose location or arrangement can be altered so as to change the particular position of the numerous possible positions of the control member that will effect the release of the exit door.

7. An apparatus for the purpose described, comprising a passageway that serves as the entrance to a compartment or space in which valuables are kept, an entrance door and an exit door for said passageway, a locking means for preventing the exit door from being opened, an operating mechanism for rendering said locking means inactive, comprising a manually-adjustable control member in said passageway that is adapted to be rotated into a selected position and thereafter moved bodily to impart movement to said operating mechanism, and means for preventing said operating mechanism from effecting the release of said exit door unless the selected position in which said control member was set is a particular one of a plurality of possible positions which said control member is capable of assuming prior to its bodily movement.

8. An apparatus for the purpose described, comprising a passageway that serves as the entrance to a compartment or space in which valuables are kept, an entrance door and an exit door for said passageway, a locking means for preventing the exit door from being opened, an operating mechanism for rendering said locking means inactive, comprising a rotatable control member in said passageway that has to be rotated into a selected position and then moved bodily to set said operating mechanism in action, means for preventing either door of the passageway from being opened after said control member has started on its bodily movement, and means for preventing said operating mechanism from effecting the release of the exit door unless the control member has previously been set in a particular one of a plurality of possible positions which it is capable of assuming prior to being moved bodily.

9. In an apparatus for the purpose described, the combination of a door, a locking means for preventing said door from being opened, an operating mechanism for rendering said locking means inactive, comprising a control member that has to be rotated into a selected position and thereafter moved bodily to set said operating mechanism in action, a multi-notched element combined with said control member, and a means that co-operates with said multi-notched element to determine the selected position of said control member which will effect the release of the exit door.

10. An apparatus of the kind described in claim 9, in which the said means that co-acts with the multi-notched element combined with the control member, is constructed so as to prevent said control member from being rotated after said control member has been started on its bodily movement.

11. An apparatus of the kind described in claim 9, equipped with a means by which a user can restore the control member to its former position in the event an error has been made in turning said control member to set it.

12. An apparatus of the kind described in claim 9, provided with means for preventing the control member and its associated notched element from being restored quickly to their normal or former position in the event an error has been made in turning said control member to set the same.

13. An apparatus of the kind described in claim 9, provided with a latch that operates automatically to hold the control member and its associated notched element against movement in any direction in the event an error has been made in turning said control member to set the same.

14. An apparatus for the purpose described, comprising a passageway that serves as the entrance to a compartment or space in which valuables are kept, an exit door and an entrance door for said passageway, a locking means for preventing said exit door from being opened, an operating mechanism for rendering said locking means inactive, comprising a control member in said passageway that is adapted to be set by rotating it, and thereafter moved bodily to set said operating mechanism in action, a multi-notched element rigidly combined with said control member, a guide with which said notched element is adapted to be engaged, a co-acting means on said guide and notched element for preventing said control member from moving bodily sufficiently to effect the release of the exit door in the event said control member has been improperly set, a latch that is adapted to engage and hold said notched element in the event said control member is moved bodily after an improper setting, a tripping means for releasing said latch, and means for causing a signal to act whenever said tripping means is manipulated.

15. An apparatus for the purpose described, comprising a passageway that serves as the entrance to a compartment or space in which valuables are kept, an exit door and an entrance door for said passageway, a locking means for preventing said exit door from being opened, an operating mechanism for rendering said locking means inactive, comprising a control member in said passageway that is adapted to be set by rotating it and thereafter moved bodily to set said operating mechanism in action, a multi-notched element rigidly combined with said control member, a guide with which said notched element is adapted to be engaged, co-acting means on said guide and notched element for preventing said control member from moving bodily sufficiently to effect the release of the exit door in the event said control member has been improperly set, a latch that is adapted to engage and hold said notched element in the event said control member is moved bodily after an improper setting, and a manually-adjustable tripping means for releasing said latch, accessible from said passageway and arranged in the path which said control member moves when said member is being restored after an improper setting.

16. An apparatus for the purpose described, comprising a passageway that serves as the entrance to a compartment or space in which valuables are kept, an entrance door and an exit door for said passageway, a door locking means, an operating mechanism for said door locking means comprising a control member that is adapted to be set and thereafter moved bodily to set said operating mechanism in action, a latch which acts automatically to lock said mechanism in an ineffective position in the event said control member was improperly set, a tripping means comprising a shiftable part accessible from and adapted to be actuated by a person in said passageway to release said latch, and means governed by said shiftable part that serves as a second lock for said operating mechanism so long as said shiftable part remains in its active position.

17. An apparatus for the purpose described, comprising a passageway that serves as the entrance to a compartment or space in which valuables are kept, an entrance door and an exit door for said passageway, a door locking means, an operating mechanism for said door locking means comprising an element provided with a plurality of notches, one of which is different from the remaining notches, a guide with which said notched element is adapted to be engaged and thereafter moved bodily to set said operating mechanism in action, and a control member in said passageway adjustably connected with said notched element for setting and actuating the same.

18. An apparatus of the kind described in claim 17 provided with a latch for engaging and locking said notched element after said notched element is moved bodily after an improper setting of same, a tripping mechanism operable from said passageway for releasing said latch, and a signal operating means that acts automatically as soon as said tripping mechanism is manipulated.

19. An apparatus of the kind described in claim 17, in which the control member consists of a numbered wheel in the passageway adjustably connected to a rod or shaft to which the notched element is rigidly fastened.

20. An apparatus for the purpose described, comprising a passageway that serves as the entrance to a compartment or space in which valuables are kept, an entrance door and an exit door for said passageway, a door locking means, an operating mechanism for said door locking means comprising a notched element located outside of said passageway and arranged so as to impart movement to said mechanism when said notched element is moved bodily, a means operable from said passageway for turning and bodily moving said notched element, means for latching said notched element in an ineffective position in the event it is improperly set, a tripping mechanism operable from said passageway for rendering said latching mechanism inoperative and holding said latching mechanism inactive, and means for preventing the operating mechanism from acting to release the door locking means when said tripping mechanism is in a condition or position to hold said latching mechanism inactive.

ANTHONY J. PICHL.
ANTHONY J. PICHL, Jr.